United States Patent
Held (10) Patent No.: US 11,285,789 B2
(45) Date of Patent: Mar. 29, 2022

(54) MODULAR RETRACTABLE DOOR ASSEMBLY FOR OPEN-AIR VEHICLE AND METHOD OF ARTICULATION DURING STOWAGE AND DEPLOYMENT

(71) Applicant: Michael P Held, West Seneca, NY (US)

(72) Inventor: Michael P Held, West Seneca, NY (US)

(*) Notice: Subject to any disclaimer, the term of this patent is extended or adjusted under 35 U.S.C. 154(b) by 0 days.

(21) Appl. No.: 16/420,984

(22) Filed: May 23, 2019

(65) Prior Publication Data

US 2019/0366812 A1 Dec. 5, 2019

Related U.S. Application Data

(60) Provisional application No. 62/679,098, filed on Jun. 1, 2018.

(51) Int. Cl.
| | |
|---|---|
| *B60J 5/04* | (2006.01) |
| *B60J 11/06* | (2006.01) |
| *B60J 5/06* | (2006.01) |

(52) U.S. Cl.
CPC ............ *B60J 5/0487* (2013.01); *B60J 5/06* (2013.01); *B60J 11/06* (2013.01)

(58) Field of Classification Search
None
See application file for complete search history.

(56) References Cited

U.S. PATENT DOCUMENTS

| | | | |
|---|---|---|---|
| 5,190,340 A | 3/1993 | Nuscher | |
| 6,439,637 B1* | 8/2002 | Tyrer | B60J 1/04 |
| | | | 296/145 |
| 7,354,092 B2* | 4/2008 | Showalter | B62D 33/0621 |
| | | | 296/77.1 |
| 8,356,855 B2* | 1/2013 | Sams | B60J 5/08 |
| | | | 296/143 |
| 9,050,879 B2 | 6/2015 | GuZZetta | |
| 9,156,336 B2* | 10/2015 | Fennell | B60J 5/08 |
| 2008/0224495 A1* | 9/2008 | Greenwood | B60J 5/125 |
| | | | 296/100.01 |
| 2013/0062905 A1* | 3/2013 | Held | B60J 5/08 |
| | | | 296/141 |
| 2019/0248218 A1* | 8/2019 | Bell | B60J 5/065 |

* cited by examiner

*Primary Examiner* — Lori L Lyjak
(74) *Attorney, Agent, or Firm* — Vincent G. LoTempio (57) ABSTRACT

A modular retractable door assembly for open-air vehicle and method of articulation during stowage and deployment. The assembly is operable with an open-air vehicle to selectively cover and uncover the passenger side openings of the vehicle with doors and rear panels that pivot and slide inwardly and outwardly to selectively cover passenger side openings in the vehicle, and stow away in a roof enclosure. Two doors and two rear panels hingedly articulate between a deployed position covering the passenger openings; and a stowed position stowed on a pair of stacked rails inside a roof enclosure. The door and rear panel operate independently of each other. Multiple upper hinge members allow the doors and rear panels to pivot about a longitudinal roof support members of the vehicle. The door and rear panels slide in and out of the roof enclosure along traversing roof support members inside the roof enclosure.

20 Claims, 8 Drawing Sheets

MODULAR RETRACTABLE DOOR ASSEMBLY FOR OPEN-AIR VEHICLE AND METHOD OF ARTICULATION DURING STOWAGE AND DEPLOYMENT

CROSS REFERENCE OF RELATED APPLICATIONS

This application claims the benefits of U.S. provisional application No. 62/679,098, filed Jun. 1, 2018 and entitled OPEN-AIR VEHICLE RETRACTABLE DOOR ASSEMBLY AND METHOD FOR DEPLOYMENT AND STOWING, which provisional application is incorporated by reference herein in its entirety.

FIELD OF THE INVENTION

The present invention relates generally to a modular retractable door assembly for open-air vehicle and method of articulation during stowage and deployment. More so, the present invention relates to a retractable door assembly that operates with an open-air vehicle, such as a golf cart, for covering the driver and passenger side openings with independent doors and rear panels that hingedly and slidably articulate between a deployed position covering the driver and passenger openings, and a stowed position inside a sun roof on the open-air vehicle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, hard and canopy covers are used to protect passengers, and golf bags and clubs located in the rear bag storage compartment of open-air vehicle, such as golf carts, from wind, rain, and damp weather conditions. It is known in the art of golf that wet golf club grips hinder the performance of the player and is undesirable. Thus, it is desirable to protect the passengers and contents of the open-air vehicle. The covering is usually at the open side passageways, and at the rear open passageway of the open-air vehicle.

Generally, hard and canopy covers attach to the back of the open-air vehicle's roof portion and to the open-air vehicle's frame section that supports the roof portion. The connection to the roof portion is typically made with an extruded channel member that accepts the top edge of the canopy. The connection to the open-air vehicle's frame is made using a structural base member that serves as a mounting base for a frame supporting the canopy. The base member generally attaches directly to the frame of the open-air vehicle. However, there are numerous styles and dimensions of open-air vehicle. Each open-air vehicle has different frame structures making it necessary to change the canopy's base member's geometry to properly mate with the open-air vehicle's structural frame. Also, it can be hard to access the hard cover or canopy in a quick manner, such as when a flash rainstorm appears on a golf course.

Other proposals have involved covering devices for golf carts. The problem with these covering devices is that they do not deploy and stow in an easy. One-handed manner. Also, they are not operable with different types of open-air vehicles. Even though the above cited covering devices for golf carts meet some of the needs of the market, a modular retractable door assembly for open-air vehicle and method of articulation during stowage and deployment is still desired.

SUMMARY

Illustrative embodiments of the disclosure are generally directed to a modular retractable door assembly for open-air vehicle and method of articulation during stowage and deployment. The modular retractable door assembly for open-air vehicle is operable with an open-air vehicle to provide independently deployable and stowable doors and rear panels that hingedly and slidably articulate between a deployed position to cover the driver and passenger side openings, and a stowed position inside a roof enclosure on the open-air vehicle.

In one non-limiting embodiment, assembly provides two doors and two rear panels that slidably and hingedly articulate to a deployed position covering the driver and passenger openings, respectively. Further, doors and rear panels slidably and hingedly articulate to the stowed position on separate traversing roof support members inside the roof enclosure. Doors and rear panels operate independently of each other, such that any combination of doors and rear panels can be deployed on either driver or passenger side of open-air vehicle, and stowed inside roof enclosure.

The assembly also provides a base panel hingedly attaches to the lower edge of doors to selectively cover a lower region of the driver or passenger side opening; and thereby provide ventilation when the doors and rear panels are deployed. Doors and rear panels utilize upper hinge members to pivot about a subframe and at least one longitudinal roof support member, respectively. Further, upper hinge members prevent removal of doors and rear panels from the roof enclosure by hooking onto subframe and longitudinal roof support member. The subframe is the framework that is connected to the door panels by hinges. The subframe seals to the golf cart against a panel or a roof support or against the cart itself. The subframe hinges down and up on the edge of the roof. The subframe retracts into the roof with or without rails or tracks.

Further, doors and rear panels slide in and out of roof enclosure along a plurality of traversing roof support members that are disposed in a spaced-apart, parallel configuration. In this manner, both driver side and passenger side doors and rear panels can be stowed together inside roof enclosure in a stacked arrangement. The subframe is identical on both the passenger and driver side. The subframes anchor between the door and longitudinal roof structure to attach the doors to the open-air vehicle. The subframes also provide an axis about which doors pivot between a deployed and stowed position. The subframes also provide an axis about which doors pivot independently from a deployed and stowed position.

Installation of doors, panels, and upper hinge members to open-air vehicle, and specifically roof support members requires no alteration to open-air vehicle; takes only about twenty minutes; and attach to existing longitudinal and traversing roof support members and roof enclosure.

One objective of the present invention is to provide a hard cover for an open-air vehicle that adapts to different frame structures, and that is easily deployable and stowable by one person.

Another objective of the present invention is to provide stowable doors and rear panels attachable to an open-air vehicle.

Yet another objective is to protect passengers and the interior of the open-air vehicle from rain, wind, snow, or incoming golf balls entering through open spaces at corners and protect the contents.

An exemplary objective is to enable the doors and rear panels to stow or cover the driver and passenger side openings independently of each other.

Another objective is to attach the assembly to existing roof supports of the open-air vehicle directly or through the use of removable weather proof molded panels fixedly attached and contoured the shape of the cart.

An exemplary objective is to install the subframe, doors, and rear panels with no alteration to the open-air vehicle, and in about 20 minutes.

Another objective is to create ventilation in the open-air vehicle when the doors and rear panels are deployed through use of at least one foldable base panel that attaches to the lower edge of the door and folds over to enable passage of airflow.

In yet another objective, the assembly provides a stacked configuration of traversing roof support member that allows the doors and rear panels on opposite sides of the open-air vehicle (driver side and passenger side) to be stowed inside the roof enclosure (sunroof) together.

Another objective is to provide an inexpensive to manufacture and easy to operate open-air vehicle retractable door assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
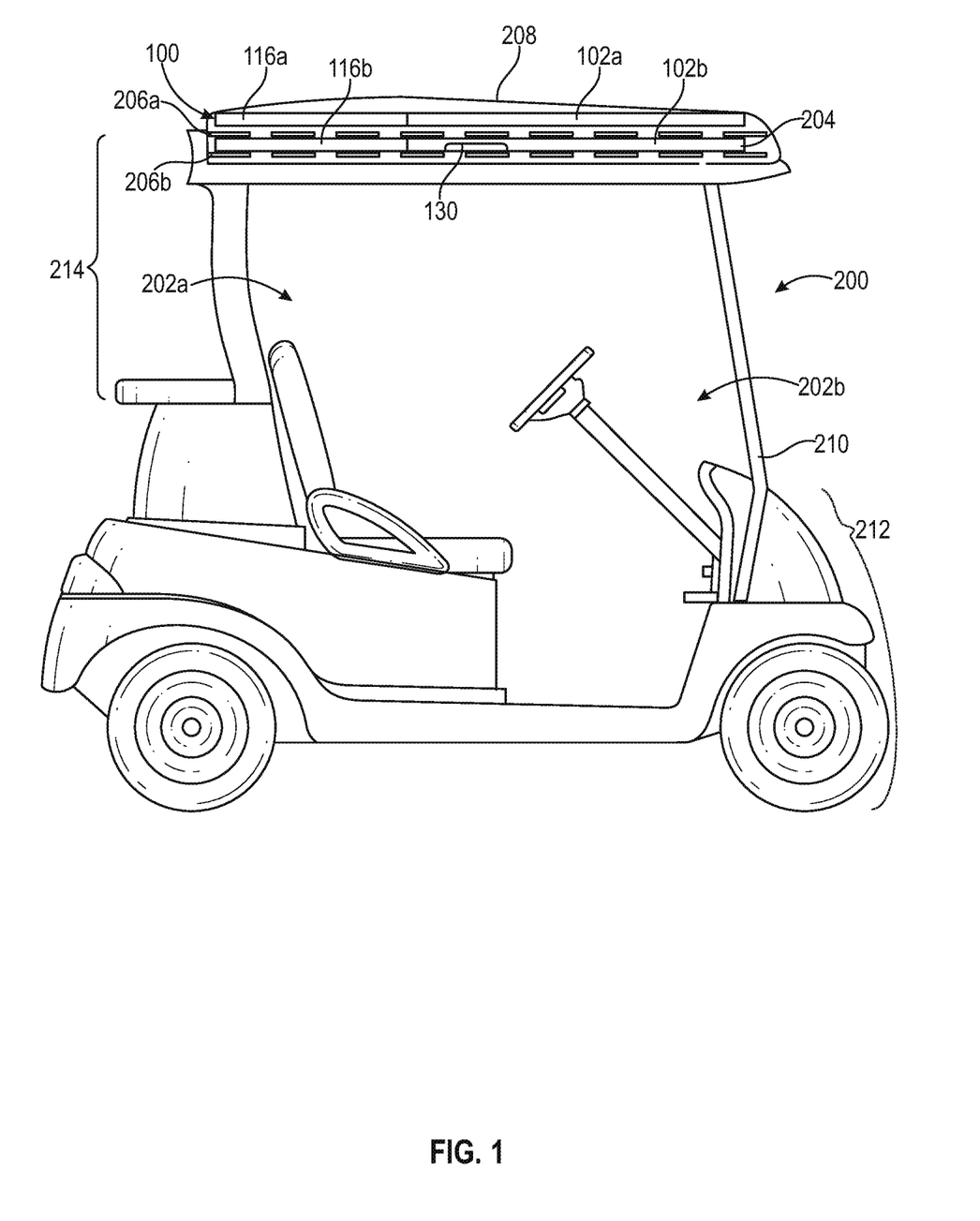
FIG. 1 illustrates a perspective view of an exemplary open-air vehicle retractable door assembly with doors and rear panels in a stowed position attached to an open-air vehicle, in accordance with an embodiment of the present invention.

A modular retractable door assembly for open-air vehicle and method of articulation during stowage and deployment is referenced in FIGS. 1-5. As FIG. 1 illustrates, a modular retractable door assembly 100 for open-air vehicle, hereafter "assembly 100" is operational with an open-air vehicle 200. Assembly 100 comprises two doors 102a-b and two rear panels 116a-b that are adapted for covering a driver side opening 202a and a passenger side opening 202b of the open-air vehicle 200, and then being easily stowed inside the roof enclosure 208 (sun roof) of the open-air vehicle 200.

The present invention provides myriad ways to stow the doors 102a-b and rear panels 116a-b. In one embodiment, separate housing structures for doors 102a-b and rear panels 116a-b can be above or below a golf car canopy. In another embodiment, the canopy or roof design can house the doors 102a-b and rear panels 116a-b above or below the roof. In yet another embodiment, the roof comprises guiderails or tracks above or below the roof to slidably receive the doors 102a-b and rear panels 116a-b. Such configurations are also designed to enable easy hinging of the doors 102a-b and rear panels 116a-b between the operational position on the sides of the open-air vehicle 200, and the stowed positon inside the roof enclosure 208.

In some embodiments, the door and rear panels can also stow on or under the integral roof of the open-air vehicle. The door and rear panels can also stow on rails that are positioned on or under the roof. Further, a new roof module can be mounted to the roof, and the doors and rear panels can be stowed inside the new roof module. Further, a roof can be fabricated and fixedly or detachably mounted to the open space or roof on the open-air vehicle.

In some embodiments, open-air vehicle 200 has an upper roof portion 214 in which the assembly is operational, and a lower body portion 212 that powers the vehicle and provides seating for passengers. The open-air vehicle 200 may include an electric golf cart, a gas-powered golf cart, and a buggy used to carry a driver, a passenger, and sporting equipment, such as golf clubs. Open-air vehicle 200 comprises an open frame 210 that does not have side doors 102a, 102b or a rear enclosures, but rather remains exposed to external elements. Open-air vehicle 200 further comprises a roof support, wheels, and an electrical or gas power source.

Figure 2A:
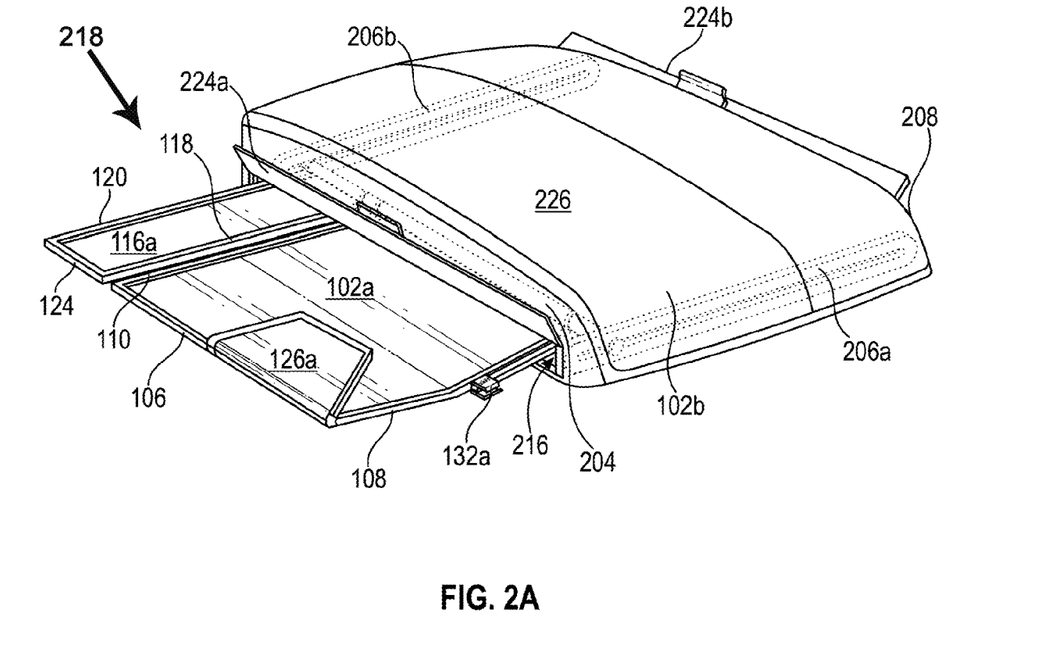
FIG. 2A illustrates a sectioned view of the open-air vehicle retractable door assembly, showing one of the passenger side doors and rear panels in a stowed position in the roof enclosure, and a second of the driver side door and rear panel in an extended position from the roof enclosure, in accordance with an embodiment of the present invention.

Looking again at FIG. 2A, roof support comprises at least one longitudinal roof support member 204, such as a pair of parallel, spaced-apart rolls bars, are disposed above the driver and passenger sides of the frame. The roof support further includes a plurality of traversing roof support member 206a, 206b that traverse the longitudinal roof support member 204. Traversing roof support member 206a-b may include a plurality of rails disposed in a spaced-apart, parallel configuration. The roof support includes further includes a roof enclosure 208 that rests atop the support members. Roof enclosure 208 is defined by a rigid panel 226 that protects doors and panels. Roof enclosure 208 may be a sun roof having sufficient interior volume to house two doors 102a, 102b and rear panels 116a, 116b in a stowed position 222, as discussed below.

Figure 2B:
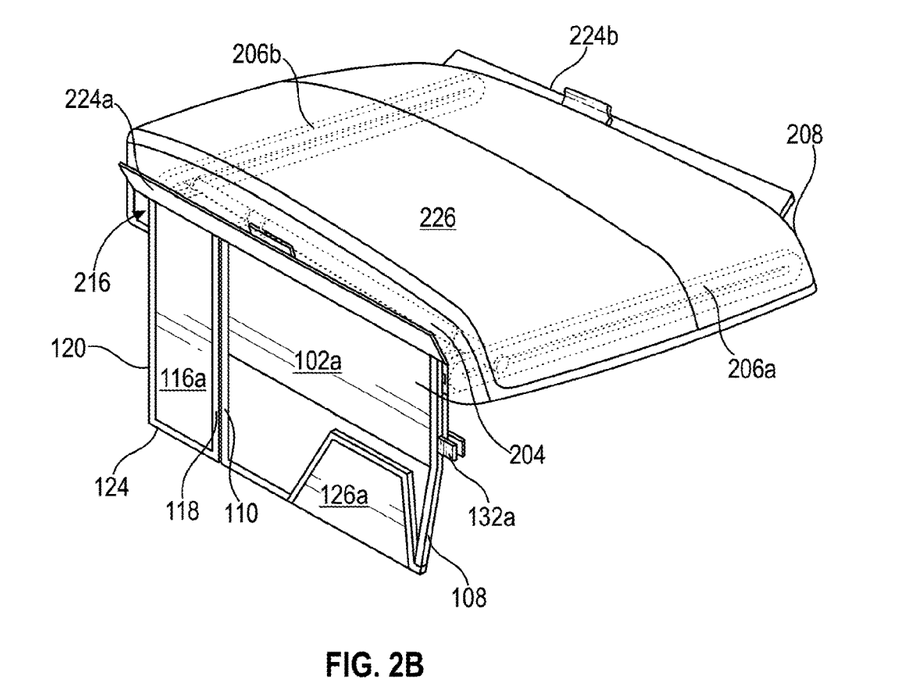
FIG. 2B illustrates a sectioned view of the open-air vehicle retractable door assembly, showing one of the passenger side doors and rear panels in a stowed position in the roof enclosure, and a second of the driver side door and rear panel in a deployed position from the roof enclosure, in accordance with an embodiment of the present invention.

FIG. 2A illustrates a sectioned view of assembly 100, showing one of the passenger side doors and rear panels in a stowed position in roof enclosure 208, and a second of the driver side door and rear panel in an extended position 218 from roof enclosure 208. FIG. 2B illustrates a sectioned view of assembly 100, showing one of the passenger side doors and rear panels in a stowed position 222 inside roof enclosure 208, and a second of the driver side door and rear panel in a deployed position 220 from the roof enclosure. Thus, doors 102a-b and the rear panels 116a-b slide from the extended position to a stowed position 222 inside the cavity 216 of roof enclosure 208. In one non-limiting embodiment, roof enclosure may have at least one roof gate 224a, 224b that regulates access to cavity 216 of roof enclosure 208.

The present invention is adapted to open-air vehicles that have an existing roof structure. Such open-air vehicles may include, without limitation, a Club Car Precedent two seater golf cart, a Club Car DS four seater golf cart having a Custom Golf Car Supply Roof with a track system, a Club Car Precedent four seater golf cart having a Custom Golf Car Supply Roof with a track system, a Club Car DS two seater golf cart, and an E-Z-GO Golf Car and the like.

Figure 4:
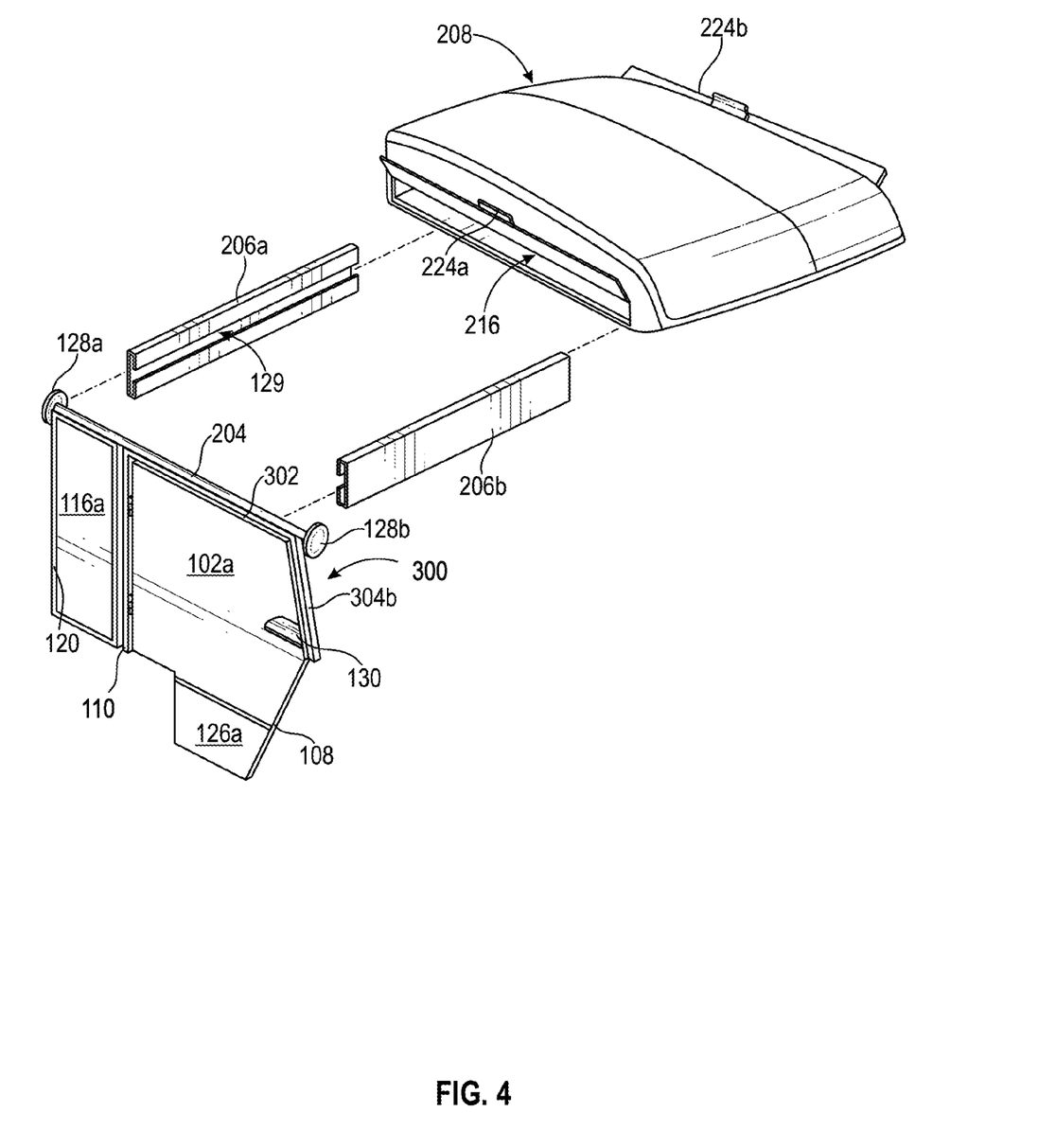
FIG. 4 illustrates a blow-up view of the first embodiment of the open-air vehicle retractable door assembly showing the door handle for opening the door from rear to front, and showing a C-rail hinging about a terminus block, in accordance with an embodiment of the present invention.

Looking at FIG. 4, assembly 100 comprises two doors 102a, 102b. A first door 102a is adapted to the passenger side, and shaped to cover the passenger side opening 202a, as configured for an open-air vehicle 200. A second door 102b is configured in substantially the same manner, but operational to cover a driver side opening 202b of open-air vehicle 200. Each door 102a-b is defined by an upper edge 104, a lower edge 106, a forward edge 108, and a rearward edge 110.

Continuing with door 102a-b structure, the forward edge 108 of door 102a-b is disposed proximally to the forward direction and steering components of the open-air vehicle 200. Rearward edge 110 of the door is disposed towards the back of the open-air vehicle 200, where golf clubs and other supplies may be stowed. FIG. 4 illustrates a blow-up view of the first embodiment of the open-air vehicle retractable door assembly showing the door handle for opening the door from rear to front. Also shown in FIG. 4 is that the traversing roof support member 206a-b may include a pair of C-rails. The C-rails slidably extend and retract, such that the door and panels can hingedly articulate about a pair of terminus blocks 128a, 128b at the ends of the longitudinal roof support member 204.

Figure 3A:
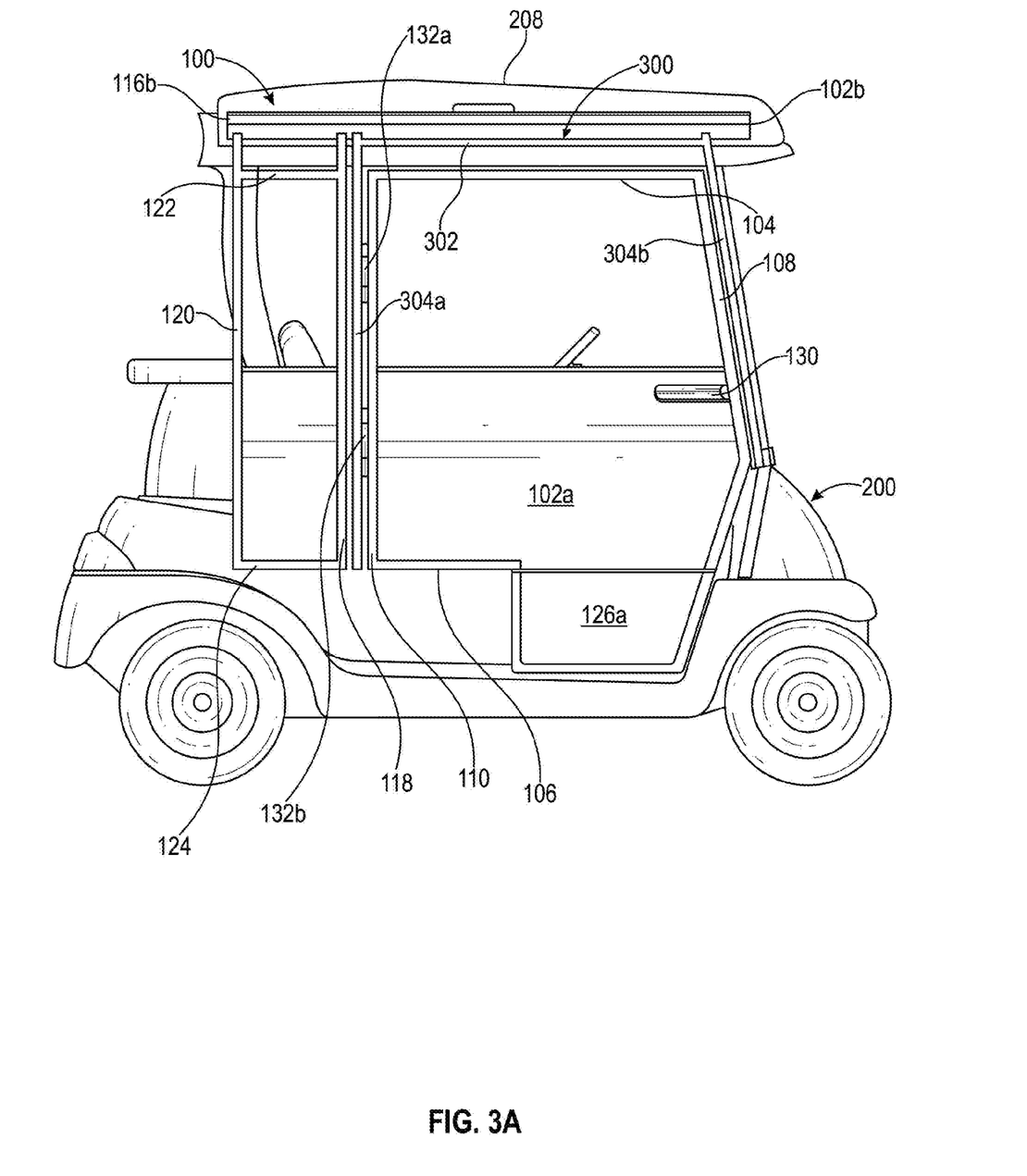
FIG. 3A illustrates a perspective view of a first embodiment of the open-air vehicle retractable door assembly with doors and rear panels in a deployed position, in accordance with an embodiment of the present invention.

In operation, the present invention provides a first embodiment in which doors 102a-b in the deployed position swings open towards the rear section of the open-air vehicle 200 (FIG. 3A). In this embodiment, door 102a-b includes a handle 130 that is disposed proximal to the forward edge 108 of each door 102a-b. Handle 130 provides a grip for hingedly articulating doors 102a-b about vertical members 304a, 304b of the subframe 300 towards the rear section of the open-air vehicle 200 (FIG. 3A). However, in other embodiments of the open-air vehicle retractable door assembly, the door handle opens the door from front to rear. Either configuration is operational in substantially the same manner.

Figure 3B:
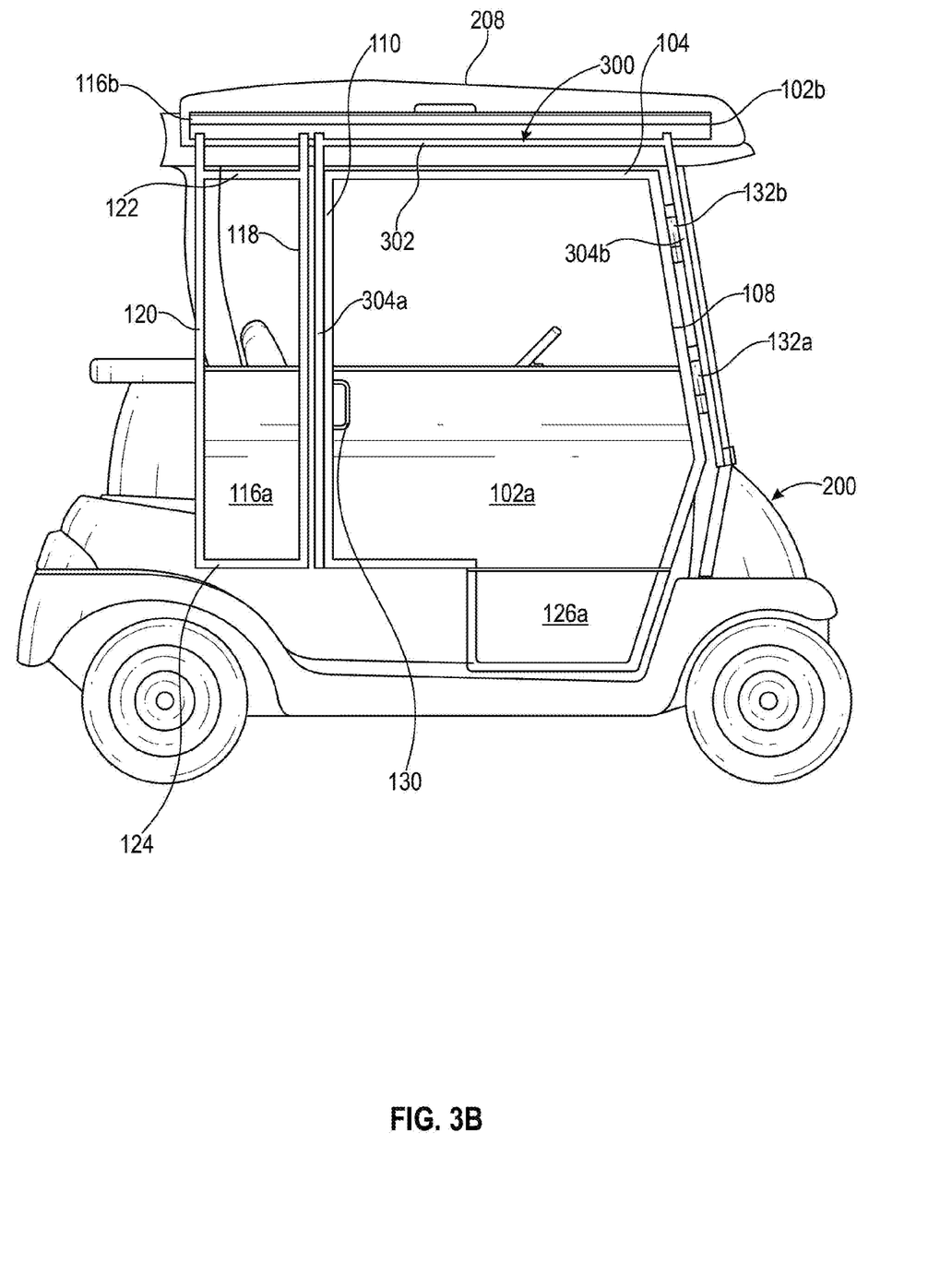
FIG. 3B illustrates a perspective view of a second embodiment of the open-air vehicle retractable door assembly with doors and rear panels in a deployed position, in accordance with an embodiment of the present invention.

And in a second embodiment, door 102a-b swings open towards the forward section of the open-air vehicle 200 (FIG. 3B). In this embodiment, door 102a-b includes a handle 130 that is disposed proximal to the rearward edge 110 of each door 102a-b. Handle 130 provides a grip for hingedly articulating doors 102a-b about vertical members 304a, 304b of the subframe 300 towards the front section of the open-air vehicle 200 (FIG. 3B).

Nonetheless, the doors 102a-b in both embodiments operate, deploy, and stow in substantially the same manner. In some embodiments, doors 102a-b may be generally rigid and fabricated from a fiberglass, polymer, or lightweight metal material. Though in other embodiments, door 102a-b are fabricated from a flexible canvas material having a rigid frame to create structure.

In one non-limiting embodiment, assembly 100 further comprises a base panel 126a, 126b that forms an appendage to the doors 102a-b. Base panel 126a, 126b is hingedly attached to the lower edge 106 of each door 102a-b. Base panel 126a, 126b is adapted to pivot about the lower edge 106 of door 102a-b. When extended to cover the driver or passenger side opening, the base panel 126a, 126b pivotally articulates to extend coplanar with the door. Thus, the base panel 126a, 126b substantially covers a lower region of the driver side opening 202a- and passenger side opening 202b, forming an extension of doors 102a-b.

However, when ventilation inside the open-air vehicle 200 is required, or when the doors 102a-b are stowed in the roof enclosure 208, the base panel 126a, 126b pivotally articulates (folds over) to overlay the door 102a-b. This creates a gap in the lower region of the driver or passenger side openings 202a-b; thereby creating ventilation in the open-air vehicle 200 by enabling passage of airflow. This is especially effective when the open-air vehicle 200 is moving.

In one non-limiting embodiment, assembly 100 further comprises two generally U-shaped subframes 300 (FIG. 4).

The subframes 300 are defined by two vertical members and a horizontal member that join to form the U-shape. In one non-limiting embodiment, subframe 300 can have 1, 2, 3, 4, or more sides. The subframes 300 anchor between the door and longitudinal roof structure to attach the doors 102a-b to the open-air vehicle 200. In one non-limiting embodiment, the subframe 300 provides a hinge point at which it can retract up into the roof.

In one non-limiting embodiment, subframe 300 is the framework that is connected to the door panels 102a-b by at least one door hinge 132a-b. The subframe 300 seals to open-air vehicle 200 against a panel, the roof enclosure 208, or against the open-air vehicle 200 itself. In another embodiment, subframe 300 hingedly articulates up and down along the edge of roof enclosure 208. Further, subframe 300 retracts into the roof along with door 102a. Subframe may slide into roof enclosure 208 either, with or without rails or tracks.

The subframes 300 provide an axis about which doors 102a-b pivot between a deployed and stowed position. The subframes 300, in essence provide a hinge area for the door to swing on so the user can enter and exit the open-air vehicle 200. In one non-limiting embodiment, subframe 300 is fabricated from a rigid, lightweight metal or polymer material. It is significant to note that the subframes 300 can retract many ways. One way it does not ride on any guiderails or tracks on the roof structure. The subframes 300 simply form a shaped pocket that supports the doors 102a-b and rear panels 116a-b. Another would use the guide rails to guide the retracting and deploying of the doors.

In a first embodiment of the invention, vertical members 304a-b of subframe 300 is configured to hingedly attach to the rearward edge 110 of the doors 102a-b about at least one door hinge 132a, 132b. And horizontal member 302 of subframe 300 fixedly attaches to upper edge 104 of the doors 102a-b (FIGS. 3A, 4A). This configuration allows the door to swing out, towards the rear section of the open-air vehicle 200.

In a second embodiment, vertical members 304a-b of subframe 300 are configured to hingedly attach to the forward edge 108 of the doors 102a-b about at least one door hinge 132a-b. And horizontal member 302 of subframe 300 fixedly attaches to upper edge 104 of the doors 102a-b (FIGS. 3A, 4A). This configuration allows doors 102a-b to swing out, towards the front section of the open-air vehicle 200. Nonetheless, the doors 102a-b and subframes 300 in both embodiments operate, deploy, and stow in substantially the same manner.

As illustrated in FIGS. 3A and 3B, the assembly 100 further comprises two rear panels 116a-b that operate adjacent to, and rearwardly of the doors 102a-b. Rear panels 116a-b are generally rectangular in shape and smaller than the doors 102a-b. Thus, rear panels 116a-b provide the driver or passenger with partial protective coverage. However in one alternative embodiment, the assembly 100 does not utilize rear panels 116a-b; but rather only two doors 102a-b on each side of the open-air vehicle 200. In this configuration, the doors may extend wider to cover a rear open section of the open-air vehicle 200.

In one non-limiting embodiment, rear panels 116a-b are defined by a panel forward vertical edge 118, a panel rearward vertical edge 120, a panel upper horizontal edge 122, and a panel lower horizontal edge 124. This may form a generally rectangular shape. In some embodiments, rear panels 116a-b may be generally rigid and fabricated from a fiberglass, polymer, or lightweight metal material. Though in other embodiments, rear panel 116a-b are fabricated from a flexible canvas material having a rigid frame to create structural integrity therein.

In one non-limiting embodiment, assembly 100 comprises a plurality of upper hinge members that allow the doors 102a-b and rear panels 116a-b to pivotally articulate between a deployed position for covering the open area of the driver and passenger sides; and a stowed position inside the roof enclosure 208. Upper hinge members may include a curved flange, or hook that catches the subframe 300 or longitudinal roof support member 204, while still allowing for pivotal articulation thereabout. It is significant to note the two hinge members for each door and rear panel provide balance when picoting up and down.

In one non-limiting embodiment, upper hinge members are adapted to hingedly and detachably attach to at least one longitudinal roof support member 204. Upper hinge members are also fixedly attached to the horizontal member of the subframe 300. This pivotal junction point enables pivotal articulation by doors 102a-b. In this manner, doors 102a-b can pivot about subframe 300 for moving between the deployed and stowed positions. Upper hinge members also prevent removal of doors 102a-b from the roof enclosure 208 by hooking onto subframe 300. And then pivoting doors 102a-b and rear panels 116a-b to the deployed position.

In another non-limiting embodiment, upper hinge members are adapted to hingedly and detachably attach to at least one longitudinal roof support member 204. Upper hinge members are also fixedly attached to the panel upper horizontal edge 122 of the rear panels 116a-b. This pivotal junction point enables pivotal articulation by the rear panels 116a-b. In this manner, rear panels 116a-b pivot about the longitudinal roof support member 204 for moving between the deployed and stowed positions. However in one alternative embodiment, hinge members are not used. But rather tracks retract out of the roof structure for the doors and rear panels to slide onto for stowage in the roof structure.

Figure 5A:
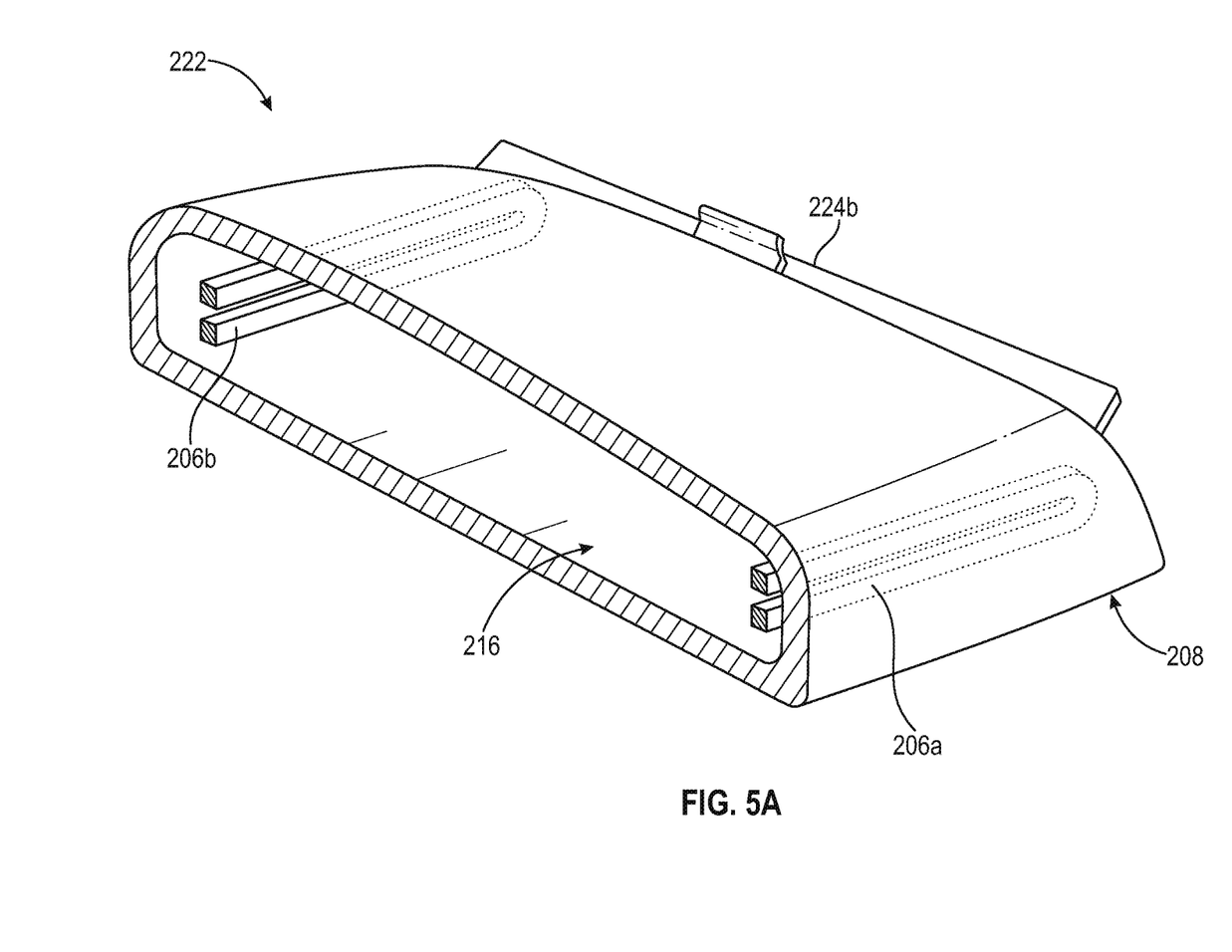
FIG. 5A illustrates a sectioned view of the roof enclosure with the panels retracted, in accordance with an embodiment of the present invention.
Figure 5B:
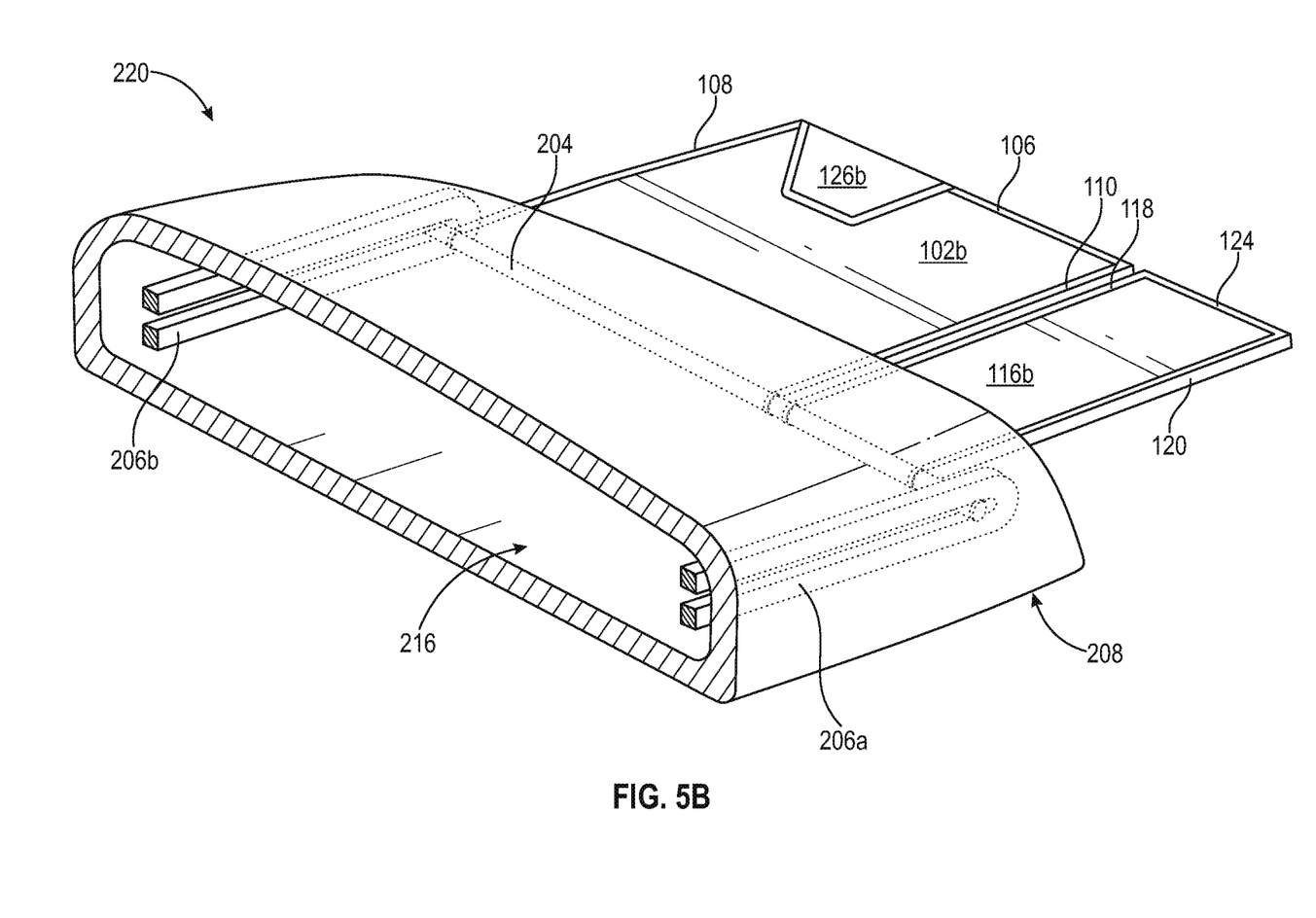
FIG. 5B illustrates a sectioned view of the roof enclosure with the panels extended, in accordance with an embodiment of the present invention.

As discussed above, doors 102a-b and rear panels 116a-b pivot independently of each other; whereby the doors 102a-b may be deployed, while the rear panels 116a-b are stowed in the roof enclosure 208. FIG. 5A illustrates a sectioned view of roof enclosure 208 with doors 102a-b and panels 116a-b retracted. Conversely, FIG. 5B illustrates a sectioned view of roof enclosure 208 with doors 102a-b and panels 116a-b retracted. Upper hinge members also prevent removal of rear panels 116a-b from the roof enclosure 208 by hooking onto longitudinal roof support member 204. And then pivoting rear panels 116a-b to the deployed position.

As shown in FIG. 4, traversing roof support members 206a-b comprise a pair of G-rails that slidably extend and retract, such that the door and panels can hingedly articulate about a pair of terminus blocks 128a, 128b at the ends of the longitudinal roof support member 204. The C-rails have a slot 129 that receives a pair of terminus blocks 128a, 128b at ends of longitudinal roof support member 204. Longitudinal roof support member 204 slides through slot 129. In the C-rail configuration, the traversing roof support members 206a-b enable doors 102a-b and the rear panels 116a-b to slide in and out of roof enclosure 208 independently of each other.

Upon being fully extended, the terminus blocks 128a-b engage and pivotally articulate doors 102a-b and rear panels 116a-b between a deployed position for substantially covering the driver side and passenger side openings 202a, 202b of the open-air vehicle 200; and a stowed position for stowage inside the roof enclosure 208. Thus, the door 102a and rear panel 116a on the driver side of open-air vehicle 200 can slide along a different rail than the door 102b and the rear panel 116b of the passenger side. This allows for each door 102a-b and rear panel 116a-b to be stowed independently of the other.

In operation, doors 102a-b and the rear panels 116a-b pivotally articulate between a deployed position for substantially covering the driver side and passenger side openings 202a, 202b of the open-air vehicle 200; and a stowed position for stowage inside the roof enclosure 208. This is accomplished by pulling the lower edge 106 of the door 102a and panel lower horizontal edge 124 of rear panel 116a from the roof enclosure 208, and across the traversing roof support member 206a-b, until the upper hinge members for the doors 102a and rear panels 116a-b engage the subframe 300 and horizontal roof support member, respectively. As discussed above, upper hinge members prevent removal of doors 102a-b and rear panels 116a-b from the roof enclosure 208 by hooking onto subframe 300 and longitudinal roof support member 204.

Doors 102a-b and rear panels 116a-b are in an extended position, generally perpendicular to the driver and passenger sides of the open-air vehicle 200. From the extended position, the doors 102a-b and rear panels 116a-b may pivot downwardly to cover the driver and passenger side openings 202a-b. This is the deployed position, generally parallel to the driver and passenger sides of the open-air vehicle 200. Further, any combination of driver side/passenger side, door/rear panel may be deployed and stowed independently of each other.

Figure 6:
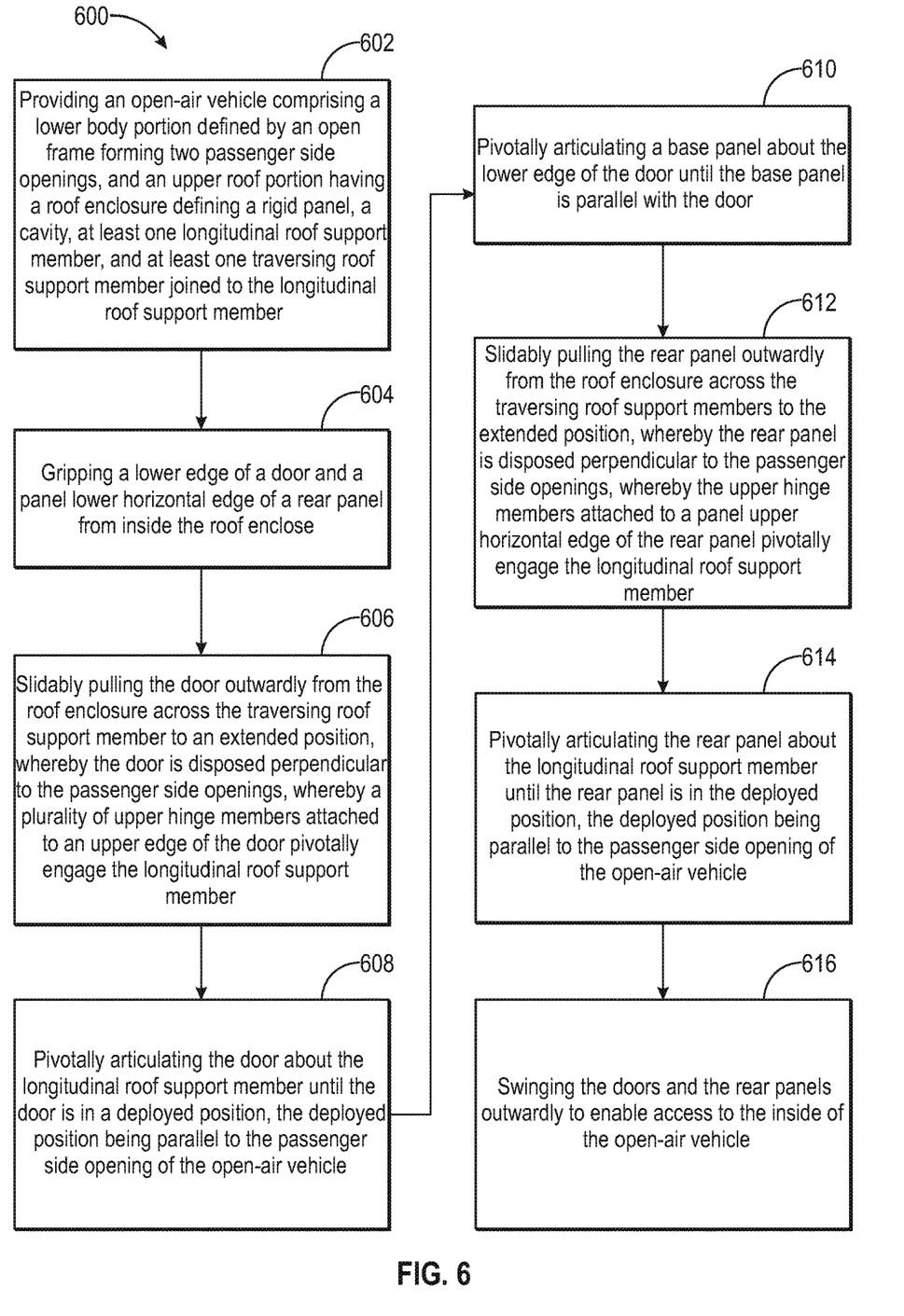
FIG. 6 references a flowchart of an exemplary method for deploying and stowing an open-air vehicle retractable door assembly, in accordance with an embodiment of the present invention.

FIG. 6 references a flowchart of an exemplary method 600 for deploying and stowing an open-air vehicle retractable door assembly. The method 600 may include an initial Step 602 of providing an open-air vehicle comprising a lower body portion defined by an open frame forming two passenger side openings, and an upper roof portion having a roof enclosure defining a rigid panel, a cavity, at least one longitudinal roof support member, and at least one traversing roof support member joined to the longitudinal roof support member.

The method 600 may further comprise a Step 604 of gripping a lower edge of a door and a panel lower horizontal edge of a rear panel from inside the roof enclose. A Step 606 slidably pulling the door outwardly from the roof enclosure across the traversing roof support member to an extended position, whereby the door is disposed perpendicular to the passenger side openings, whereby a plurality of upper hinge members attached to an upper edge of the door pivotally engage the longitudinal roof support member.

In some embodiments, a Step 608 comprises pivotally articulating the door about the longitudinal roof support member until the door is in a deployed position, the deployed position being parallel to the passenger side opening of the open-air vehicle. A Step 610 includes pivotally articulating a base panel about the lower edge of the door until the base panel is parallel with the door.

In some embodiments, a Step 612 may include slidably pulling the rear panel outwardly from the roof enclosure across the traversing roof support members to the extended position, whereby the rear panel is disposed perpendicular to the passenger side openings, whereby the upper hinge members attached to a panel upper horizontal edge of the rear panel pivotally engage the longitudinal roof support member.

A Step 614 comprises pivotally articulating the rear panel about the longitudinal roof support member until the rear panel is in the deployed position, the deployed position being parallel to the passenger side opening of the open-air vehicle. A final Step 616 includes swinging the doors and the rear panels outwardly to enable access to the inside of the open-air vehicle.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A retractable door assembly for open-air vehicle, the open-air vehicle comprising a lower body portion and an upper roof portion having a roof enclosure defining a cavity, the assembly comprising:
    at least one door defined by an upper edge, a lower edge, a forward edge, and a rearward edge;
    at least one subframe defined by at least one vertical member and a horizontal member, the at least one vertical member hingedly attached to the rearward edge of the at least one door, the horizontal member attached to an upper edge of the at least one door; and
    a plurality of upper hinge members being fixedly attached to the horizontal member of the subframe,
    whereby the at least one door and the at least one subframe slide from an extended position covering the lower body portion of the open-air vehicle to a stowed position inside the cavity of the roof enclosure.

2. The assembly of claim 1, wherein the at least one door comprises two doors, each door having a handle disposed proximal to the forward edge of each door, the handle providing a grip for hingedly articulating the doors about the vertical member of the at least one subframe.

3. The assembly of claim 2, further comprising a base panel hingedly attached to the lower edge of the at least one door, the base panel adapted to pivot about the lower edge of the at least one door, the base panel being pivotable to extend coplanar with the at least one door and to overlay the at least one door.

4. The assembly of claim 3, wherein the open-air vehicle comprises a lower body portion and an upper roof portion having an open frame forming two passenger side openings, at least one longitudinal roof support member, and at least one traversing roof support member joined to the longitudinal roof support member.

5. The assembly of claim 4, wherein the at least one traversing roof support member comprises a pair of C-rails forming a slot.

6. The assembly of claim 5, wherein the longitudinal roof support member terminates at a pair of terminus blocks, the terminus blocks being slidable through the slot in the C-rails and wherein the doors and a rear panel pivot about the longitudinal roof support member independently of each other.

7. The assembly of claim 6, wherein the at least one door and the rear panel pivot to a deployed position for substantially covering the passenger side openings of the open-air vehicle.

8. The assembly of claim 7, wherein the doors and the rear panel pivot to an extended position for uncovering the passenger side openings of the open-air vehicle.

9. The assembly of claim 8, wherein the at least one traversing roof support member includes two traversing roof support members disposed in a spaced-apart stacked arrangement.

10. The assembly of claim 9, wherein the at least one door and the rear panel slide along a traversing roof support member independently of each other.

11. The assembly of claim 10, wherein the at least one door and the rear panel slide from the extended position to a stowed position inside the cavity of the roof enclosure.

12. The assembly of claim 11, wherein the vertical member of the U-shaped subframe hingedly attaches to the rearward edge of the at least one door through at least one door hinge.

13. The assembly of claim 12, wherein the subframes slide from the extended position to the stowed position inside the cavity of the roof enclosure.

14. The assembly of claim 13, wherein the base panel pivotally articulates to overlay the at least one door in the stowed position.

15. The assembly of claim 1, wherein the longitudinal roof support member comprises a roll bar.

16. A modular retractable door assembly for open-air vehicle, the assembly comprising:
    two doors defined by an upper edge, a lower edge, a forward edge, and a rearward edge, the doors adapted for covering two passenger side openings of an open-air vehicle,
    the open-air vehicle comprising a lower body portion defined by an open frame forming two passenger side openings, and an upper roof portion having a roof enclosure defining a cavity, at least one longitudinal roof support member, and at least one traversing roof support member joined to the longitudinal roof support member;
    two base panels hingedly attached to the lower edge of the doors, the base panels adapted to pivot about the lower edge of the doors, the base panels being pivotable to extend coplanar with the door and to overlay the door,
    whereby the doors and the rear panels pivot about the longitudinal roof support member independently of each other,
    whereby the doors and the rear panels pivot to a deployed position for substantially covering the passenger side openings of the open-air vehicle,
    whereby the doors and the rear panels pivot to an extended position for uncovering the passenger side openings of the open-air vehicle,
    whereby the doors and the rear panels slide along the traversing roof support member independently of each other,
    whereby the doors and the rear panels slide from the extended position to a stowed position inside the cavity of the roof enclosure;
    two U-shaped subframes defined by a pair of vertical members and a horizontal member, the vertical members hingedly attached to the rearward edge of the doors through at least one door hinge, the horizontal member fixedly attached to the upper edge of the doors,
    whereby the U-shaped subframes slide from the extended position to the stowed position inside the cavity of the roof enclosure;
    two rear panels defined by a panel forward vertical edge, a panel rearward vertical edge, a panel upper horizontal edge, and a panel lower horizontal edge;
    a plurality of upper hinge members being fixedly attached to the horizontal member of the subframe and the panel upper horizontal edge of the rear panels, the upper hinge members further being hingedly and detachably attached to the longitudinal roof support member; and
    a handle disposed proximal to the forward edge of each door, the handle providing a grip for hingedly articulating the doors about the vertical member of the U-shaped subframe.

17. The assembly of claim 16, wherein the base panel pivotally articulates to overlay the doors when the doors are in the stowed position.

18. The assembly of claim 16, wherein the longitudinal roof support member comprises a roll bar.

19. The assembly of claim 16, wherein the at least one traversing roof support member comprises a rail.

20. A method of articulation during stowage and deployment of a modular retractable door assembly for open-air vehicle, the method comprising:
    providing an open-air vehicle comprising a lower body portion defined by an open frame forming two passenger side openings, and an upper roof portion having a roof enclosure defining a rigid panel, a cavity, at least one longitudinal roof support member, at least one roof gate regulating access to the cavity, and at least one traversing roof support member joined to the longitudinal roof support member;
    gripping a lower edge of a door and a panel lower horizontal edge of a rear panel from inside the roof enclose;
    slidably pulling the door outwardly from the roof enclosure across the traversing roof support member to an extended position, whereby the door is disposed perpendicular to the passenger side openings, whereby a plurality of upper hinge members attached to an upper edge of the door pivotally engage the longitudinal roof support member;
    pivotally articulating the door about the longitudinal roof support member until the door is in a deployed position, the deployed position being parallel to the passenger side opening of the open-air vehicle;
    pivotally articulating a base panel about the lower edge of the door until the base panel is parallel with the door;
    slidably pulling the rear panel outwardly from the roof enclosure across the traversing roof support members to the extended position, whereby the rear panel is disposed perpendicular to the passenger side openings, whereby the upper hinge members attached to a panel upper horizontal edge of the rear panel pivotally engage the longitudinal roof support member;
    pivotally articulating the rear panel about the longitudinal roof support member until the rear panel is in the deployed position, the deployed position being parallel to the passenger side opening of the open-air vehicle; and
    swinging the doors and the rear panels outwardly to enable access to the inside of the open-air vehicle.

* * * * *